April 24, 1928.  1,667,437

A. R. ROGERS

MACHINE FOR CUTTING FISH

Filed Sept. 29. 1926  3 Sheets-Sheet 1

A. R. Rogers.
Inventor

April 24, 1928.

A. R. ROGERS 1,667,437

MACHINE FOR CUTTING FISH

Filed Sept. 29, 1926

A. R. Rogers.
Inventor

By C. A. Snow & Co.
Attorneys.

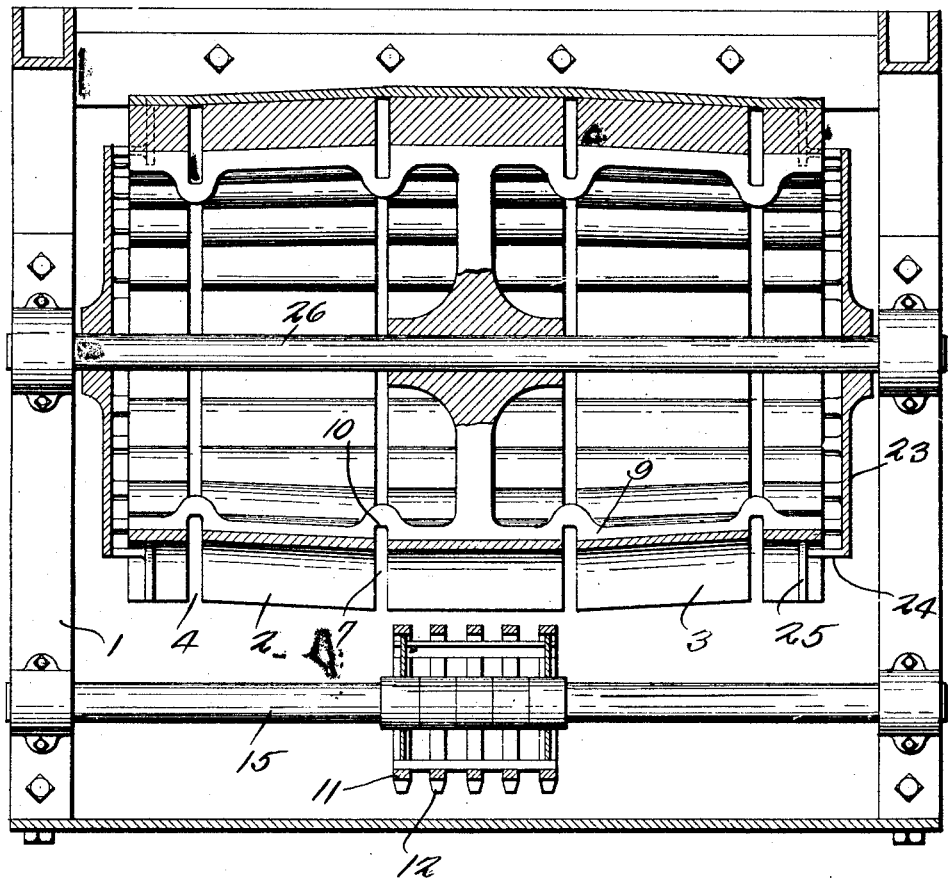

Patented Apr. 24, 1928.

1,667,437

UNITED STATES PATENT OFFICE.

ARTHUR R. ROGERS, OF JONESPORT, MAINE.

MACHINE FOR CUTTING FISH.

Application filed September 29, 1926. Serial No. 138,423.

This invention relates to a machine for cutting off the heads and tails of fish, such as sardines, and it is designed primarily as an improvement upon the structure disclosed in the patent to Cleveland, No. 1,129,168.

It has been found in practice that a machine of the type mentioned has produced excellent results when used for cutting off the heads and tails of large fish but it has not been successfully used in the cutting of small sizes of fish.

It is an object of the present invention to provide certain improvements whereby the machine can be employed successfully in cutting off the heads and tails of small fish.

It is also an object of the invention to improve upon the means for severing the fish and to provide a means whereby the fish will rapidly move against the stops or gages that have been provided therefor, thus expediting the cutting operation and increasing the capacity of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings:

Figure 3 is a section on line 3—3 Figure 2.

Figure 1:
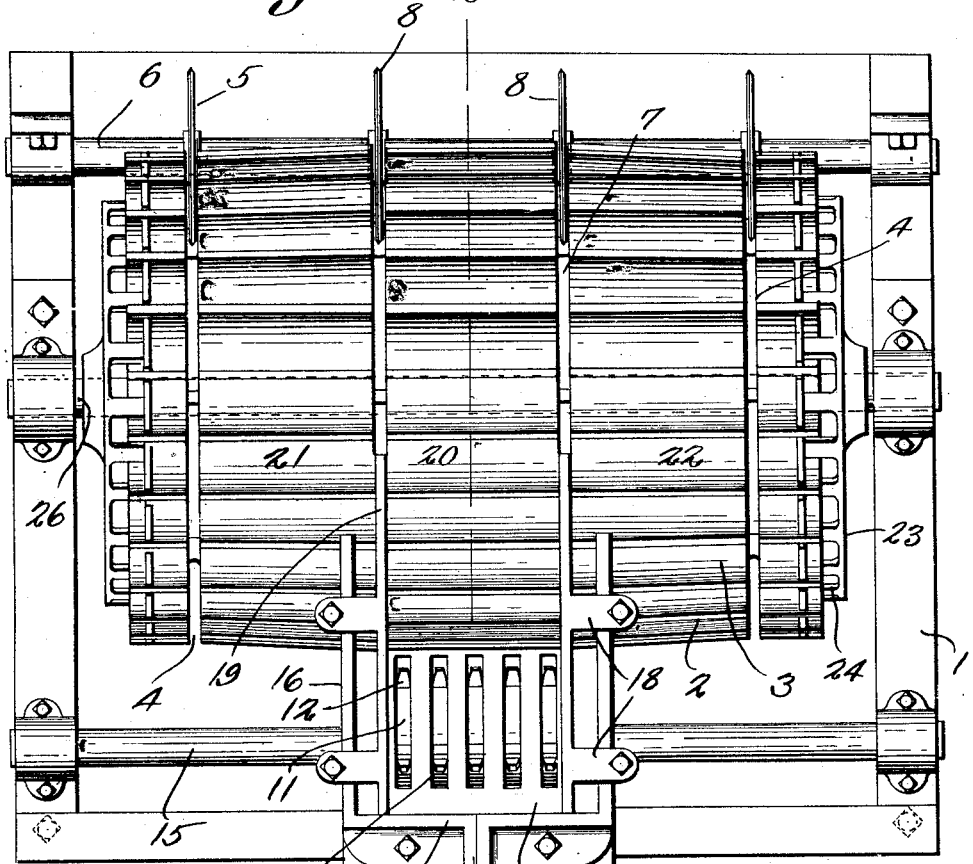
Figure 1 is a plan view of the machine.
Figure 4:
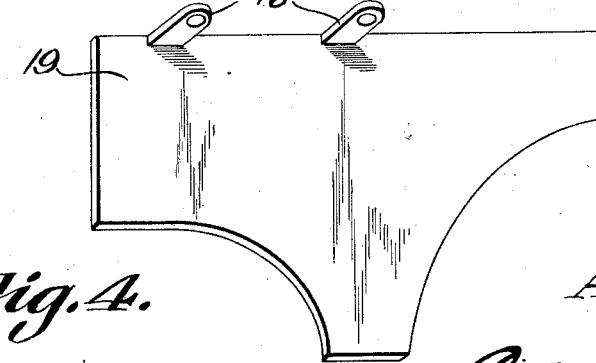
Figure 4 is a perspective view of one of the removable partitions.
Figure 2:
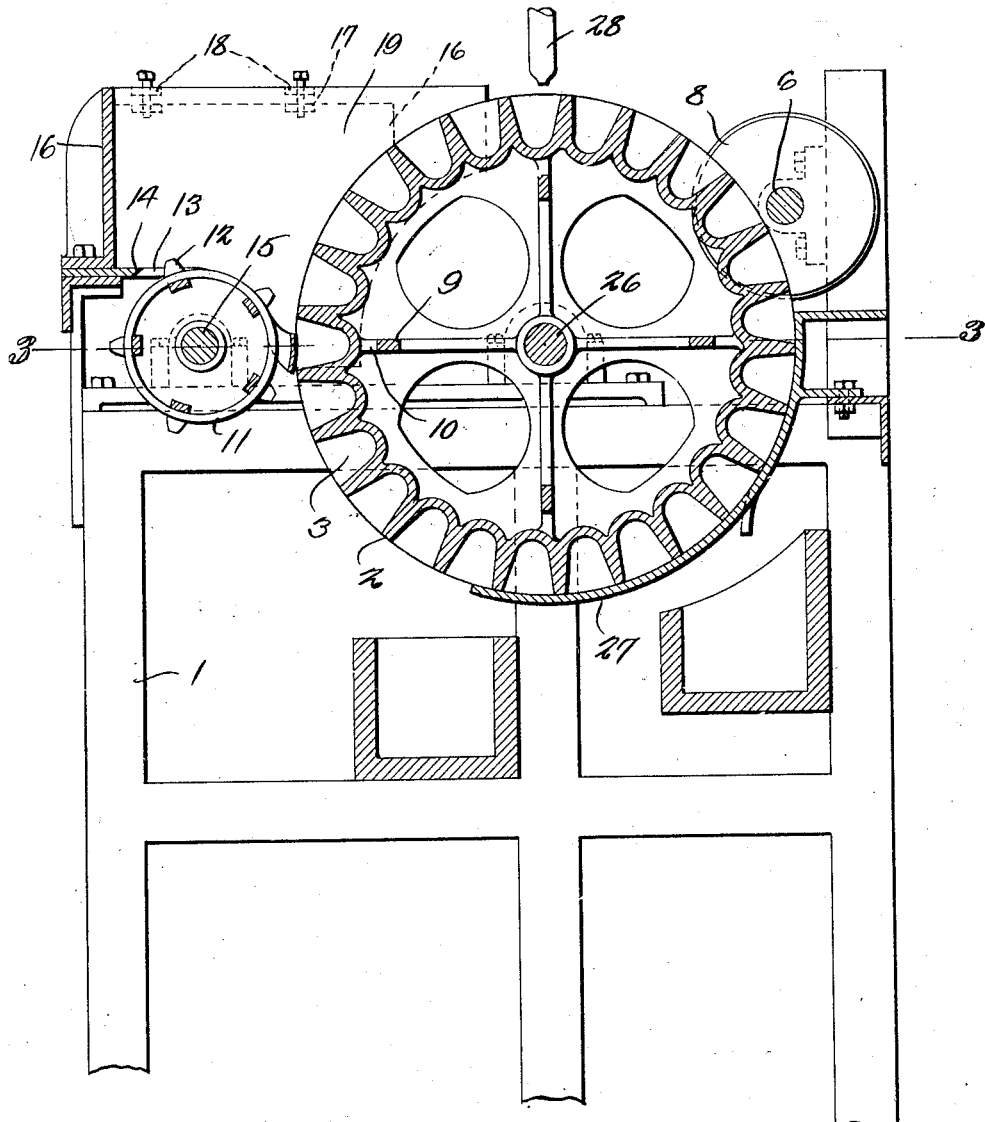
Figure 2 is a section on line 2—2 Figure 1.

Referring to the figures by characters of reference 1 designates a portion of the frame of the structure in which is journaled a rotary carrier 2 in the form of a drum provided in its periphery with longitudinal channels 3. These channels, as shown particularly in Figures 1 and 3 are slightly inclined from near their centers toward their ends so that when a fish is placed in the uppermost channel it will tend to gravitate toward either end. Formed within the carrier near each end is an annular slot 4, these slots being adapted to receive the circular cutters 5 which are mounted on a shaft 6. At opposite sides of the center of the drum are formed additional annular slots 7 for the reception of intermediate circular cutters 8. For the purpose of holding the sections of the carrier together where the slots 4 and 7 are located, longitudinal reinforcing flanges 9 are provided within the drum, the flanges being off-set and recessed at 10 where they bridge the slots. A rotatable feed wheel, indicated at 11, is arranged adjacent the periphery of the carrier drum 2 and has outwardly projecting teeth 12 designed to work within a slot 13 formed in a plate 14 extending over the feed wheel. This feed wheel is carried by a shaft 15 which, when rotated, will operate the wheel so as to direct the fish against the carrier where they will become seated within the channel.

The feed wheel is arranged adjacent the bottom of a box 16 having side brackets 17. To these side brackets are detachably connected ears 18 extending from partition plates 19 so shaped as to extend close to the plate 14 and into the intermediate slots 7. Thus when the partitions are in place the carrier surface is divided into an intermediate fish receiving space and end fish receiving spaces indicated at 20, 21 and 22 respectively.

A gage is located at each end of the carrier, each gage including a disk 23 having laterally extending fingers 24 carrying stops 25 which are seated within the respective channels 3. These disks are mounted on the shaft 26 supporting the carrier 2.

In the present construction the axis of rotation of the cutters 5 is above the level of the axis of rotation of the carrier, it having been found in practice that this location is preferable to the arrangement of the cutter below the carrier. With the present arrangement the cutters can shear down through the fish and into the slots so as to completely sever the fish, the operation being more efficient than where the fish are supported by a shield extending under the carrier as in the Cleveland patent hereinbefore mentioned. In the present instance an arcuate shield 27 is utilized but this is provided solely for the purpose of insuring proper disposal of the parts of the fish after the cutting operation.

A nozzle 28 is supported above the center of the carrier for the purpose of directing water onto said carrier at the annular ridge portion thereof where the carrier is of greatest diameter.

In practice the fish will be directed by the wheel 11 into the pockets of the rotating carrier and by using the partitions 19 small fish will be held properly centered so that, as they are brought into position under the nozzle 28, they will be caused to slide toward the left or toward the right of the carrier, according to the direction in which the head is pointing. As the channel in which the fish are located is inclined toward the end, the movement of the fish will be expedited. While the fish are still resting upon the bottom of the channel and firmly supported thereby, they will come against the cutters 5 in the path thereof and these cutters will remove the heads and tails, the fish being properly positioned by the gage stop 25. When larger fish are treated the partition can be removed.

By providing a means whereby small fish are centered on the carrier the fish will be properly distributed toward both ends thereof because there is no danger of all the fish being mounted closer to one end than to the other during the feeding operation.

What is claimed is:—

1. A machine for cutting fish including a rotary drum tapered toward its ends from its center and having longitudinal channels in its periphery, said channels being inclined from intermediate points toward the ends of the drum, means for centering fish upon the central portion of the drum and within the respective channels, cutters working transversely of the channels while the drum is in motion, and means for washing fish from the center of the drum head first toward the ends of the channels into the path of the cutters.

2. A machine for cutting fish including a rotatable drum having longitudinal channels in its periphery, there being annular slots in the drum intersecting the channels, rotary cutters projecting into the slots and mounted for rotation about an axis above the level of the axis of rotation of the drum, said cutters projecting into the slots and adapted to sever fish carried by the downwardly moving portion of the drum, means for feeding the fish into the drum, and means for directing the fish laterally within the channels toward the ends of the drum.

3. A machine for cutting fish including a rotary drum having longitudinal channels in the periphery thereof, said channels being inclined from intermediate points toward the ends thereof, there being annular slots within the drum intersecting the channels, rotary cutters projecting into the respective slots, means for feeding fish onto the drum, removable partitions insertible into certain of the slots for holding fish centered upon the carrier while being fed thereto, means for shifting the centered fish longitudinally within the channels toward the respective ends of the drum, a stop in the outer end portion of each channel and means connecting the stops at the respective ends of the channels, said means being shiftable to simultaneously adjust all of the stops carried thereby.

4. In a machine for cutting fish, a drum mounted for rotation and tapered from its center toward its ends to provide a central annular ridge, fish receiving channels in the periphery of the drum extending from end to end thereof, means for centering fish on the ridge and within the respective channels with heads pointing toward either end of the drum, means for directing a jet of water on to the fish to wash them along the channels in the directions in which their heads are pointed, and adjustable stops in the end portions of the channels for limiting the movement of the fish within the channel.

5. A fish cutting machine including a rotatable drum tapered toward its ends from its center to provide a central annular ridge, channels extending from end to end of the periphery of the drum, means for centering fish on the ridge and in the respective channels with their heads pointed in either direction, there being annular slots in the drum intersecting the channels, rotatable cutters projecting into the slots, stops within the channels adjacent the respective ends of the drum, and means for supporting the stops at each end of the drum for simultaneous adjustment toward or from the slots.

In testimony that I claim the foregoing as my own, I have hereto affixed my signature.

ARTHUR R. ROGERS.